United States Patent Office 3,803,208
Patented Apr. 9, 1974

3,803,208
NOVEL α-CYANO ESTERS OF ISOCYANIC ACID AND α-CYANOALKYLCARBAMOYL HALIDES EFFECTIVE AS INTERMEDIATES FOR HERBICIDAL AGENTS
Karoly Szabo, Stiegengasse 4/16, A–1060 Vienna, Austria, and Venkat Rao Ganti, 21 Caton Drive, Dewitt, N.Y. 13214
No Drawing. Filed May 8, 1972, Ser. No. 251,480
Int. Cl. C07c 121/16, 121/46, 121/66
U.S. Cl. 260—465.4
4 Claims

ABSTRACT OF THE DISCLOSURE

This invention relates to novel α-cyano esters of isocyanic acid and α-cyanoalkylcarbamoyl halides. It also relates to a process for the manufacture of said compounds and to the use of said compounds in the preparation of effective herbicidal agents.

---

This invention relates to novel compounds having the formula:

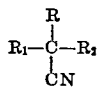

wherein R represents a member selected from the group consisting of —NCO and —NHCOCl; $R_1$ is methyl, ethyl, or when taken together with $R_2$ forms a cycloalkyl group having from 3 to 6 carbon atoms; $R_2$ represents a member selected from the group consisting of alkyl $C_1$–$C_8$, cycloalkyl $C_3$–$C_6$, or

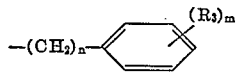

where $R_3$ is hydrogen, halogen, or loweralkyl $C_1$–$C_4$; $n$ is an integer selected from the group 0, 1, and 2 and $m$ is an integer selected from the group 0, 1, 2, and 3.

The invention also relates to a process for the preparation of the above-identified α-cyano ester of isocyanic acid and α-cyanoalkylcarbamoyl halides. These compounds are useful as intermediates in the synthesis of highly effective herbicidal agents.

In accordance with the present invention, compounds of the structure:

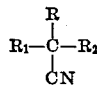

wherein R, $R_1$, and $R_2$ are as described above, can be prepared by first reacting the appropriate ketone with an alkali metal cyanide, such as sodium or potassium cyanide, and an ammonium salt, preferably the halide or sulfate, in the presence of ammonium hydroxide. The reaction is generally conducted in aqueous solution or in an aqueous-alcoholic mixture, the alcohol preferably being a lower alkanol of from 1 to 4 carbon atoms. Although the reaction may be carried out at room temperature, it is frequently found desirable to heat the reaction mixture to about 40° C. to 100° C., but preferably 40° C. to 55° C.

This reaction yields the aminonitrile corresponding to the ketone employed. The reaction is graphically illustrated below using KCN as the alkali metal cyanide and ammonium hydroxide as the base.

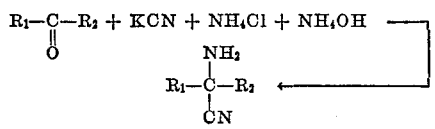

wherein $R_1$ is methyl, ethyl, or when taken together with $R_2$ forms a cyanoalkyl $C_3$–$C_6$; $R_2$ is alkyl $C_1$–$C_8$ (either straight or branched chain), cycloalkyl $C_3$–$C_6$, or

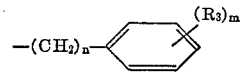

where $R_3$ is hydrogen, halo or loweralkyl $C_1$–$C_4$; $n$ is 0, 1, or 2 and $m$ is 0, 1, 2, or 3.

Where desired the aminonitrile is converted to its hydrohalide salt, preferably its hydrochloride salt, by dissolving the free base in anhydrous ether; for example, diethyl ether, tetrahydrofuran, or ethyl ether, and then admixing with said solution the desired hydrohalide. Generally, it is most convenient to mix the acid with anhydrous ether and add this mixture to the ether solution of aminonitrile. The hydrohalide salt precipitates and can be filtered off.

The aminonitrile, or the hydrohalide salt thereof, is then dissolved or dispersed in an aprotic solvent, such as acetone, ethyl acetate, benzene, toluene, diethyl ether, tetrahydrofuran, or the like. This solution may then be cooled to about 0° C. to 10° C. and treated with phosgene gas or a solution of phosgene in aprotic solvent, as described above, may be prepared and the aminonitrile solution added to it. In both process techniques, however, the reaction is conducted at a low temperature, preferably about 0° C. to 10° C., although lower temperatures may be used. When admixture of the phosgene (with or without a base, such as anhydrous alkali metal carbonate, or an organic tertiary amine) with the aminonitrile has been completed, regardless of the process used, the carbamoyl chloride corresponding to the aminonitrile can be recovered from the solution. This is usually accomplished by filtering the reaction mixture and evaporating the filtrate under reduced pressure. Where the corresponding isocyanate is desired, the reaction mixture is heated to reflux, then cooled and the solvent evaporated. Generally, about 1 to 2 moles of phosgene per mole of aminonitrile is satisfactory for the reaction. Graphically, the reaction may be illustrated as follows:

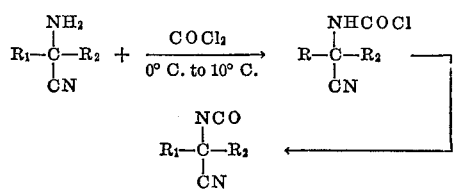

wherein $R_1$ and $R_2$ are as described above. Reflux temperature for the latter reaction is generally between about 40° C. to 100° C., and preferably 40° C. to 60° C.

As previously indicated, the α-cyano esters of isocyanic acid and the α-cyanoalkylcarbamoyl halides, which have the formula:

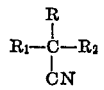

where R is —NCO or —NHCOCl, and $R_1$ and $R_2$ are as described above, are useful for the preparation of effective herbicidal agents. These compounds may be converted to the active agents by reacting said isocyanate or isocyanic acid ester with a ureido phenol in an aprotic solvent, such as acetone, ethyl acetate, benzene, toluene, diethyl ether, tetrahydrofuran, or the like. The reaction is carried out in the presence of a weak base, such as sodium or potassium carbonate or organic tertiary amine, such as triethylamine. The reaction is usually exothermic and does not require heating. It is advantageous to employ at least a molar equivalent of base when using —NHCOCl. Graphically, it may be illustrated as follows:

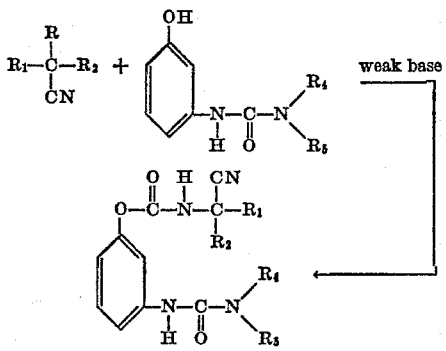

where R, $R_1$, and $R_2$ are as described above; $R_4$ is alkyl $C_1$–$C_5$; and $R_5$ is a member selected from the group consisting of alkyl $C_1$–$C_5$ and alkoxy $C_1$–$C_5$. The preemergence and postemergence herbicidal activity of these phenylcarbamate products is demonstrated in the examples below.

The following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

2-amino-2,3,3-trimethylbutyronitrile

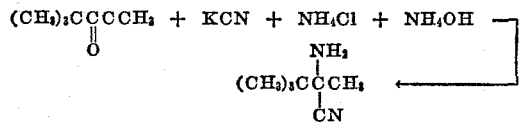

To a two-liter flask is added 66 grams of KCN dissolved in 120 ml. of water, along with a magnetic stirring rod. When almost all of the cyanide is dissolved, 140 ml. of water containing 61 grams of $NH_4Cl$ is introduced into the flask followed by the addition thereto of 67 ml. of concentrated ammonium hydroxide. A solution of the ketone, i.e., 100 grams of pinacolone in 150 ml. of methanol, is added to the mixture and stirred. The mixture was heated to 45° C. to 55° C. for 18 hours and the solvent evaporated to yield the product, a dark heavy oil.

The hydrochloride salt is then obtained by dissolving the oil in anhydrous diethyl ether and admixing therewith hydrochloric acid, preferably in anhydrous diethyl ether. The mixture is filtered and the solvent removed by evaporation under reduced pressure leaving the hydrochloride salt of the aminonitrile.

EXAMPLE 2

2-amino-2-methylbutyronitrile

Methyl ethyl ketone (72 grams) is mixed with 73 grams of ammonium sulfate. To this suspension is then added 200 ml. of solvent ether. The mixture is then stirred at 20° C. to 25° C. (slight cooling). A solution of sodium cyanide (50 grams in 200 ml. of water) is then added dropwise during one hour and the reaction mixture stirred for 7 to 10 hours. The inorganic salts were filtered off and aqueous layer extracted three times with 200 ml. portions of ether. All ether extracts are combined, dried over anhydrous potassium carbonate, and then concentrated by evaporation under vacuum.

The residue is distilled at 15 mm. to give 45 to 50 grams of product with boiling point 68° C.

EXAMPLE 3

Following the procedure of Example 1, but substituting the appropriate ketone for pinacolone, yields the corresponding aminonitriles reported in Table I below. The hydrochloride salts of each are likewise prepared as described in Example 1.

Ketone → Aminonitrile $$R_1-\underset{O}{\underset{\|}{C}}-R_2 + KCN + NH_4Cl + NH_4OH \longrightarrow R_1-\underset{CN}{\underset{|}{C}}-R_2 \text{ with } NH_2$$

TABLE I

Ketone/aminonitrile

| $R_1$ | $R_2$ |
|---|---|
| Methyl | Methyl. |
| Do | Isopropyl. |
| Do | Phenyl. |
| Ethyl | Butyl. |
|  | Cyclohexyl |
|  | Cyclopentyl |
| Methyl | t-Butyl. |
| Do | n-Propyl. |
| Do | sec-Butyl. |
| Do | Benzyl. |
| Do | Phenethyl. |
| Ethyl | Benzyl. |
| Methyl | Cyclopropyl. |
| Do | 2-ethylbutyl. |
| Ethyl | Cyclobutyl. |
| Methyl | p-Chlorophenyl. |
| Do | 2,3-dichlorophenyl. |
| Do | p-Chlorophenethyl. |
| Ethyl | 2-ethylhexyl. |
| Methyl | 3-methylbutyl. |

EXAMPLE 4

1-cyano-1,2-dimethylpropyl isocyanate

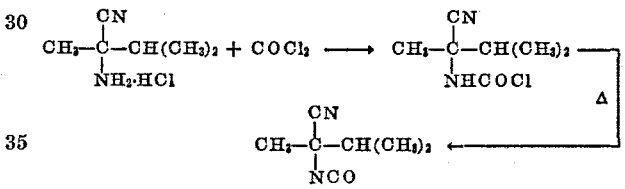

Forty-one grams of 2-amino-2,3-dimethylbutyronitrile hydrochloride is dispersed in 220 ml. of ethyl acetate. The suspension is stirred and phosgene gas bubbled through said suspension. The suspension is gently heated (40° C. to 45° C.) for three hours, then the phosgene and ethyl acetate are removed by heating on a water bath at 90° C. The residue is taken up in dry hexane, filtered and the hexane evaporated to yield 15 grams of product, refractive index $n_D^{25}$ 1.4260.

EXAMPLE 5

1-cyano-1,2,2-trimethylpropyl isocyanate

Following the procedure of Exampe 4 and substituting 2-amino-2,3,3-trimethylbutyronitrile for 2-amino-2,3-dimethylbutyronitrile yields 1-cyano-1,2,2-trimethylpropyl isocyanate. Boiling point 77° C. to 80° C. at 1 to 2 mm.

EXAMPLE 6

1-cyano-1,3-dimethylbutyl isocyanate

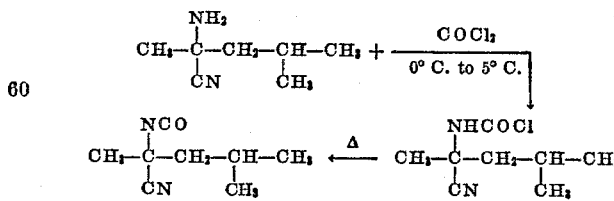

25.2 grams of 2-amino-2,4-dimethylpentanonitrile was dissolved in 100 ml. of anhydrous ether; 50 ml. of ether saturated with HCl is then added. The precipitated HCl salt is filtered off and dried in a dessicator. The total HCl salt is then used for the conversion to isocyanate using anhydrous reagent grade ethyl acetate as solvent.

The HCl salt is dispersed in 100 ml. of the ethyl acetate and slowly added to a stirred, cold (0° C. to 5° C.) solution of phosgene (80 grams) in 150 ml. of ethyl acetate. Stirring is continued for one hour, then cooling discontinued and the reaction mixture refluxed.

The mixture is cooled and the solvent evaporated under reduced pressure. The residue is extracted with hot hexane and the product recovered by distillation. The product had boiling point 47° C. to 54° C./0.75 mm.; $n_D^{26}$ 1.4460.

EXAMPLE 7

1-cyano-1-methylpropylisocyanate

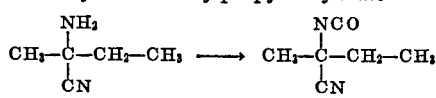

2-amino-2-methylbutyronitrile (39.2 grams) is dissolved in 100 ml. of dry ethyl acetate and added dropwise to a solution of 80 grams of phosgene in 150 ml. of ethyl acetate with vigorous stirring during one hour. The temperature should not be allowed to go over 5° C.

After all the aminonitrile is added, the cooling is discontinued, phosgene gas passed in, and the mixture heated to reflux. Almost all the solid goes into solution, resulting in a golden yellow color. The time of passage of phosgene is 2 to 2½ hours.

Most of the ethyl acetate is removed by distillation by heating on a water bath, leaving a thick viscous residue, which on distillation yields the product, boiling point 54° C. 56° C. at 12 to 14 mm.; $n_D^{26}$ 1.4165.

This procedure is followed with appropriate aminonitrile substitutions to yield the esters of isocyanic acid and isocyanates, reported in Table II.

To a suspension of 1,1-dimethyl 3-(m-hydroxyphenyl)-urea (620 mg.) in 5 ml. of dry reagent grade acetone, a drop of triethylamine is added, followed by 420 mg. of 1-cyano-1-methylpropylisocyanate all at once. The reaction is very exothermic and a clear solution results. After standing for 15 minutes, a crystalline mass comes out of solution. The product (1.0 gram) is filtered off and washed with ice-cold acetone to give a melting point of 145° C. to 147° C.

EXAMPLE 9 m-(3-methoxy-3-methylureido)phenyl (1-cyano-1-methylpropyl)-carbamate

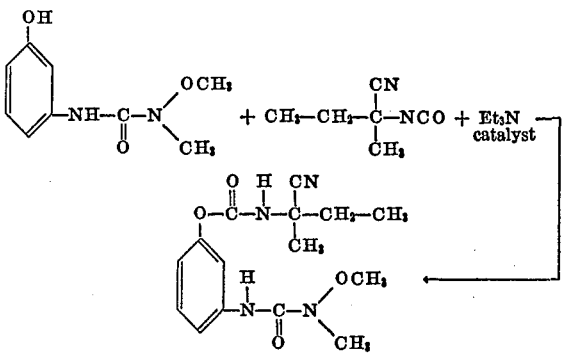

TABLE II

| Aminonitrile | COCl₂ 0° C. to 5° C. ethyl acetate | α-Cyanoalkylcarbamoyl halide | Reflux | Isocyanate | Isocyanate characterization |
|---|---|---|---|---|---|
| Ph-C(CN)(CH₃)-NH₂·HCl | COCl₂ 0° C. to 5° C. ethyl acetate | Ph-C(CN)(CH₃)-NHCOCl | Reflux | Ph-C(CN)(CH₃)-NCO | B.p. 86–88° C. at 1.25 mm. |
| CH₃-C(CH₃)(CN)-NH₂ | Same as above | CH₃-C(CH₃)(CN)-NH-COCl | ...do... | CH₃-C(CH₃)(CN)-NCO | B.P. 144–145° C. |
| Cyclohexyl-C(CN)-NH₂·HCl | ...do... | Cyclohexyl-C(CN)-NHCOCl | ...do... | Cyclohexyl-C(CN)-NCO | B.P. 62° C. at 0.7–1 mm. |
| Cyclopentyl-C(CN)-NH₂·HCl | ...do... | Cyclopentyl-C(CN)-NHCOCl | ...do... | Cyclopentyl-C(CN)-NCO | B.P. 52–54° C. at 0.5–0.7 mm. |
| CH₃-CH₂-C(CN)(CH₂-CH₂-CH₂CH₃)-NH₂·HCl | ...do... | CH₃CH₂-C(CN)((CH₂)₃-CH₃)-NHCOCl | ...do... | CH₃-CH₂-C(CN)((CH₂)₃CH₃)-NCO | B.P. 69–80° C. at 1–2 mm. |

EXAMPLE 8 m-(3,3-dimethylureido)phenyl (1-cyano-1-methylpropyl)carbamate

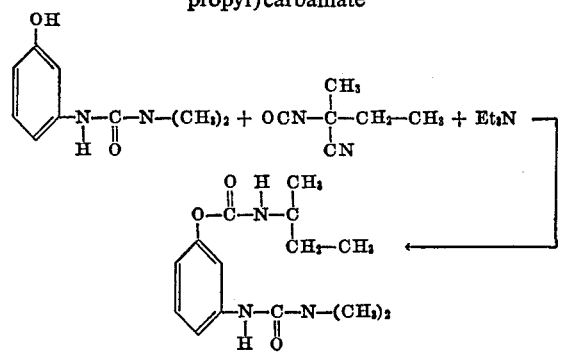

1.96 grams of 3-(m-hydroxyphenyl)-1-methoxy-1-methyurea is dissolved in 20 ml. of acetone, a few drops of triethylamine are added, followed by 1.25 grams of the 1-cyano-1-methylpropylisocyanate. The reaction is exothermic. The reaction mixture is refluxed for one hour and then cooled. The mixture on cooling deposited a crystalline product, which is filtered off, and washed with ice-cold acetone to give 2.4 grams with melting point 147° C. to 149° C.

The mother liquors on dilution with an equal volume of hexane, yields more of the product melting at the same temperature.

EXAMPLE 10 m-(3-methoxy-3-methylureido)phenyl (1-cyano-1-methylethyl)-carbamate

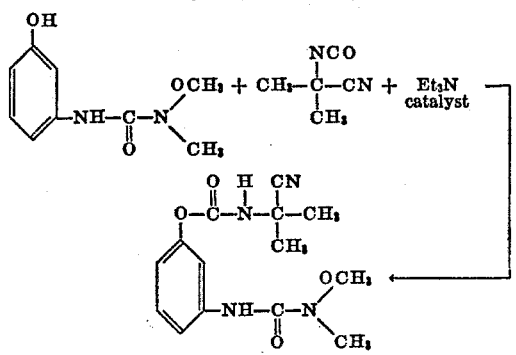

To 10 ml. of anhydrous acetone is added first, 1.95 grams of the 3-(m-hydroxyphenyl)-1-methoxy-1-methylurea and then 1.3 grams of 1-cyano-1-methylethylisocyanate. Three drops of triethylamine is then added to the mixture and a mildly exothermic reaction occurs. A white solid product precipitates which is collected and dried. The yield is 2.5 grams of product, melting point 165° C. to 167° C.

EXAMPLE 11 m-(3-methoxy-3-methylureido)phenyl (1-cyano-1-methylethyl)-carbamate

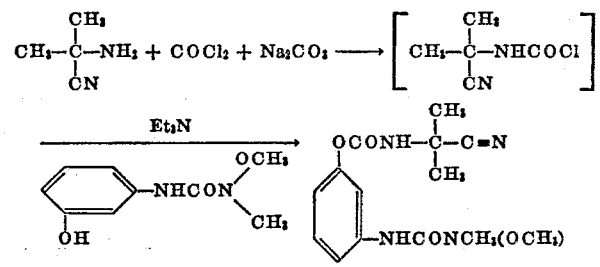

To a phosgene solution (12 grams, 0.12 mole) in dry ethyl acetate (180 ml.) cooled to 0° C. was added anhydrous sodium carbonate (1.5 grams, 0.14 mole), then dropwise with cooling 2-methyl-2-aminopropionitrile (8.4 grams, 0.1 mole) in ethyl acetate (40 ml.). A white solid was formed during the addition. After one hour the reaction mixture was allowed to attain reaction temperature (20° C.). Then it was gradually warmed to 60° C. taking 30 minutes. Further phosgene was passed through the mixture for a further 30 minutes at 60° C. to 67° C. and the reaction mixture became clear, was filtered and evaporated under reduced pressure to a colorless oil. The infrared spectrum showed very intense absorption at 1740 to 1780 cm.$^{-1}$ assignable as the carbamoyl chloride $$\left(\begin{array}{c} \text{C—Cl group} \\ \| \\ \text{O} \end{array}\right)$$

The crude carbamoyl chloride was added to 3-(m-hydroxyphenyl) - 1-methoxy-1-methyl urea (17.64 grams, 0.09 mole), triethylamine (11 grams, 0.11 mole) in ethyl acetate (50 ml.) at 25° C. A solid precipitated, further triethylamine (2 grams, 2 moles) was added after the addition and the reaction mixture temperature rose to 33° C., was cooled to 18° C. for 30 minutes and filtered. The filtrate was evaporated almost to dryness, then water-acetone added and a further 2.3 grams (9%), melting point 157° C. to 160° C. was obtained. Total yield 22.4 grams (89%). The solid was stirred with water and dried to give 20.1 grams (30%), melting point 167 C. to 168° C.

EXAMPLE 12

The herbicidal activity of carbamate compounds prepared from the esters of isocyanic acid and from the isocyanates of the present invention is demonstrated in the following post-emergence tests. In these tests, ten-day old crabgrass, yellow foxtail, wild oats, mustard, bindweed and bush ben plants are sprayed with 35%/65% water/acetone solutions of test compound. Each flat was sprayed with 15 ml. of solution containing 50 mg. of compound. The sprayed plants were then placed on greenhouse benches and cared for in accordane with normal greenhouse procedures. Three weeks after treatment, all plants were examined and rated. The results obtained appear in Table III below.

TABLE III.—POSTEMERGENCY ACTIVITY

| Compound | Percent kill | | | | | |
|---|---|---|---|---|---|---|
| | Crab-grass | Fox-tail | Wild oats | Mus-tard | Bind-weed | Bush beans |
| (structure 1) | 100 | 100 | 100 | 100 | 100 | 100 |
| (structure 2) | Stunted | 100 | 100 | 100 | 100 | 100 |

EXAMPLE 13

Postemergence activity of the carbamates prepared from the esters of isocyanic acid and the isocyanates of the present invention is further demonstrated by the following tests. In these tests, compounds are applied to two-week-old plants in a 35%/65% water/acetone mixture containing sufficient compound to provide the equivalent of 4 pound per acre of active compound. After spraying, the plants are placed on greenhouse benches and cared for in accordance with normal greenhouse procedures. Three weeks after treatment, the plants are examined and rated (Table IV) according to the index given below:

Species:
    MG—annual morning glory
    COT—cotton
    SB—sugar beet
    SOY—soybean
    COR—corn
    WO—wild oats
    BA—barnyardgrass
    FOX—green foxtail
    MI—foxtail millet
    RAG—ragweed
    MU—mustard
    LA—lambsquarters Rating system:
                                        Percent difference in growth from the check [1]

0—no effect                           0
1—possible effect                   1–10
2—slight effect                       11–25
3—moderate effect                 26–40
5—definite injury                   41–60
6—herbicidal effect               61–75
7—good herbicidal effect        76–90
8—approaching complete kill     91–99
9—complete kill                     100
4—abnormal growth, i.e., a definite physiological malformation but with an over-all effect less than a 5 on the rating scale.

[1] Based on visual determination of stand, vigor, chlorosis, growth malformation, and over-all plant appearance.

TABLE IV.—POSTEMERGENCE ACTIVITY

| Compound | Rating | | | | | | | | | |
|---|---|---|---|---|---|---|---|---|---|---|
| | MG | COT | SB | SOY | WO | BA | FOX | RAG | MU | LA |
| (structure 1) | 9 | 9 | 9 | 9 | 9 | 9 | 9 | 9 | 9 | 9 |
| (structure 2) | 9 | 9 | 9 | 9 | 8 | 8 | 1 | 9 | 9 | 9 |
| (structure 3) | 9 | 9 | 9 | 9 | 9 | 9 | 8 | 9 | 9 | 9 |
| (structure 4) | 9 | 9 | 9 | 9 | 9 | 9 | 9 | 9 | 9 | 9 |
| (structure 5) | 9 | 9 | 9 | 9 | 8 | 9 | 9 | 9 | 9 | 9 |
| (structure 6) | 9 | 9 | 8 | 9 | 8 | 7 | 9 | 9 | 9 | 9 |

| Compound | MG | COT | SB | SOY | WO | BA | FOX | RAG | MU | LA |
|---|---|---|---|---|---|---|---|---|---|---|
| 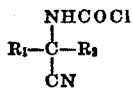 | 3 | 7 | 3 | 5 | 7 | 2 | 9 | 8 | 9 | 9 |
| 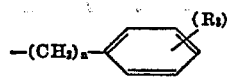 | 5 | 9 | 9 | 9 | 8 | 7 | 9 | 9 | 9 | 3 |
| 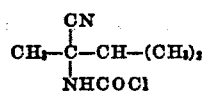 | 9 | 8 | 5 | 9 | 7 | 5 | 9 | 9 | 8 | 6 |
| 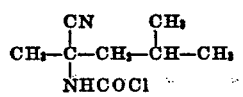 | -- | -- | -- | -- | 0 | 0 | 5 | 5 | 9 | 0 |

We claim:
1. A compound having the structure:

$$R_1-\underset{\underset{CN}{|}}{\overset{\overset{NHCOCl}{|}}{C}}-R_2$$

wherein $R_1$ is methyl or ethyl, or when taken together with $R_2$ forms a cycloalkyl having from 3 to 6 carbon atoms and $R_2$ represents a member selected from the group consisting of $C_1$-$C_8$ alkyl, $C_3$-$C_6$ cycloalkyl and $$-(CH_2)_n\!-\!\!\!\underset{}{\underset{}{\bigcirc}}\!\!(R_3)_m$$

where $R_3$ is halogen or $C_1$-$C_4$ alkyl, $n$ is an integer from 0 to 2 and $m$ is an integer from 0 to 3.

2. The compound according to claim 1:

$$CH_3-\underset{\underset{NHCOCl}{|}}{\overset{\overset{CN}{|}}{C}}-CH-(CH_3)_2$$

3. The compound according to claim 1:

$$CH_3-\underset{\underset{NHCOCl}{|}}{\overset{\overset{CN}{|}}{C}}-CH_2-\underset{\underset{}{|}}{\overset{\overset{CH_3}{|}}{CH}}-CH_3$$

4. The compound according to claim 1:

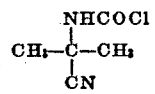

References Cited
UNITED STATES PATENTS

| 3,437,680 | 4/1969 | Farrissey et al. | 260—465.4 X |
| 3,454,606 | 7/1969 | Brotherton et al. | 260—465 D X |
| 3,453,310 | 7/1969 | Zenner et al. | 260—465 D X |
| 3,644,458 | 2/1972 | Kampe | 260—465.4 X |
| 3,501,523 | 3/1970 | Sayigh et al. | 260—465.4 X |
| 3,489,797 | 1/1970 | Koenig et al. | 260—465.4 X |
| 3,492,332 | 1/1970 | Sayigh et al. | 260—465 D X |

OTHER REFERENCES

Singer et al.: C. A. 61 (1964), p. 9452.
Knabe et al.: C. A. 73 (1970), pp. 279–280, section 55535R.
Derwent Belgian Patent Report, No. 49/67, p. 3:4–5 (Jan. 8, 1968).

JOSEPH P. BRUST, Primary Examiner

U.S. Cl. X.R.

71—76, 105; 260—464, 465 D, 465.4, 465.5 R